United States Patent
Leffler et al.

(10) Patent No.: US 12,429,832 B2
(45) Date of Patent: Sep. 30, 2025

(54) SYSTEMS AND METHODS FOR CONTROL OPTIMIZATION OF BUILDING SUBSYTEMS

(71) Applicant: Carrier Corporation, Palm Beach Gardens, FL (US)

(72) Inventors: Robert Leffler, Portland, ME (US); Matthew Clark, Rochester, NY (US); Ahmad Mahmoud, Windsor, CT (US); Phani Pavan Kumar Mangiahgari, Hyderabad (IN); Alexander Healey, Syracuse, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 636 days.

(21) Appl. No.: 17/810,020

(22) Filed: Jun. 30, 2022

(65) Prior Publication Data
US 2023/0105859 A1    Apr. 6, 2023

Related U.S. Application Data

(60) Provisional application No. 63/261,676, filed on Sep. 27, 2021.

(51) Int. Cl.
*G05B 13/04* (2006.01)
*H02J 3/00* (2006.01)
*H02J 3/38* (2006.01)

(52) U.S. Cl.
CPC .................. *G05B 13/048* (2013.01)

(58) Field of Classification Search
CPC ............... G05B 13/048; H02J 2300/24; H02J 2310/12; H02J 3/004; H02J 3/381; H02J 13/00004; H02J 3/003
USPC .......................................................... 700/1
See application file for complete search history.

(56) References Cited

U.S. PATENT DOCUMENTS

| | | |
|---|---|---|
| 8,078,330 B2 | 12/2011 | Brickfield et al. |
| 9,489,701 B2 | 11/2016 | Emadi et al. |
| 10,263,462 B2 * | 4/2019 | Fife .......................... H02J 7/00 |
| 10,452,090 B2 | 10/2019 | Scelzi |
| 10,901,446 B2 | 1/2021 | Nesler et al. |
| 2016/0195576 A1 | 7/2016 | Hurri et al. |
| 2023/0369858 A1 * | 11/2023 | Nakagawa ......... G06Q 30/0202 |

* cited by examiner

*Primary Examiner* — Michael J Brown
(74) *Attorney, Agent, or Firm* — Souad Hakim

(57) ABSTRACT

Systems and methods for control optimization of building subsystems are disclosed. In some embodiments, a system comprises at least one processor; and memory storing instructions executable by the at least one processor, the instructions when executed cause the system to: obtain building load information, the building load information related to one or more power consuming subsystems of the building; determine a future building load based on the building load information; and adjust one or more setpoint tolerances for the one or more subsystems based on the determined future building load.

14 Claims, 7 Drawing Sheets

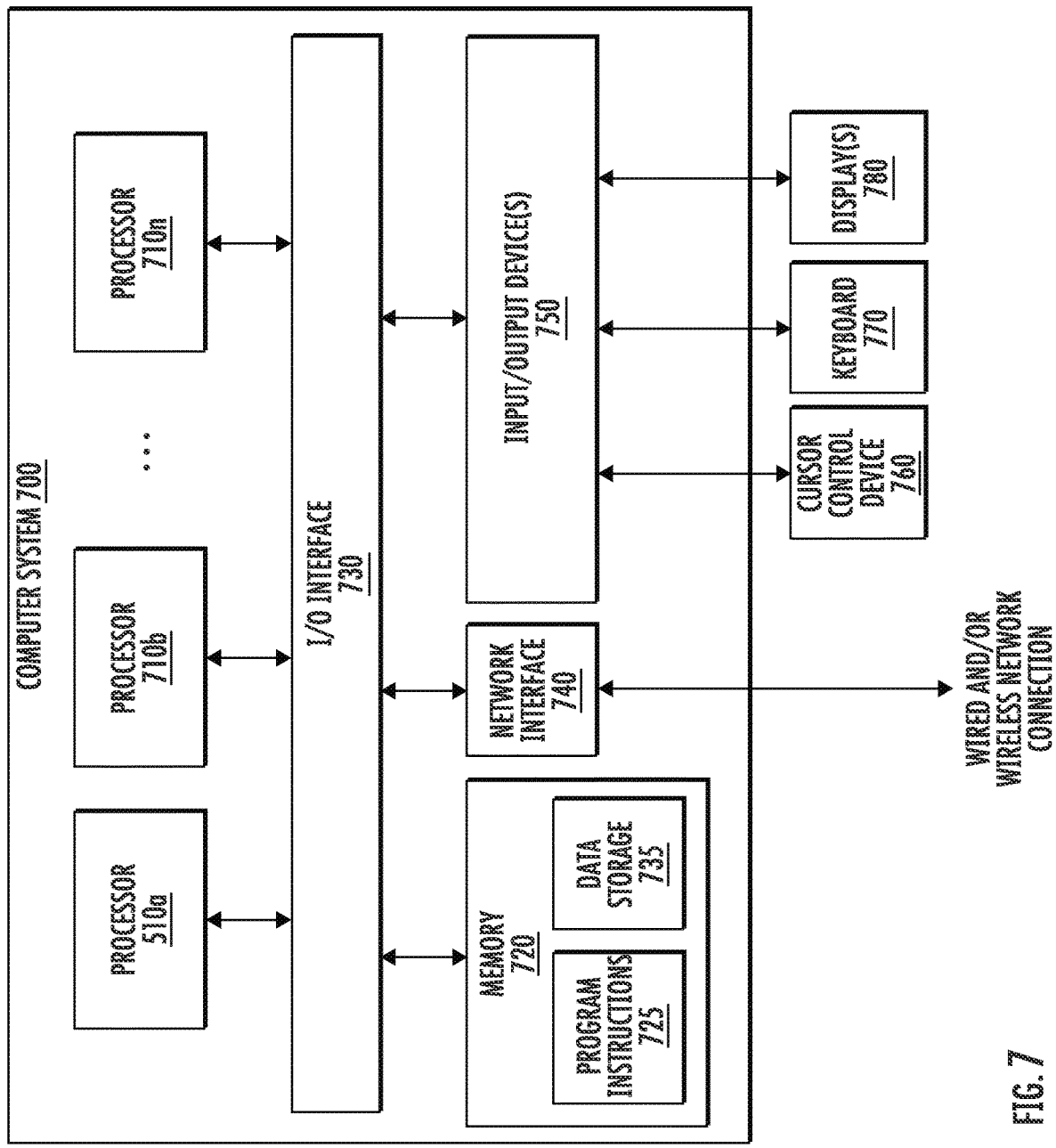

SYSTEMS AND METHODS FOR CONTROL OPTIMIZATION OF BUILDING SUBSYTEMS

CROSS REFERENCE TO A RELATED APPLICATION

The application claims the benefit of U.S. Provisional Application No. 63/261,676 filed Sep. 27, 2021, the contents of which are hereby incorporated in their entirety.

FIELD OF THE INVENTION

The invention relates generally to control of building subsystems and, more specifically, to control optimization of building subsystems.

BACKGROUND

Microgrids provide multiple energy generation sources to buildings connected to the microgrid. Generally, the energy generation sources may include renewable energy sources as well as grid power. The microgrid connected buildings may have access to information related to available power sources, energy costs, building loads, etc. However, control operation and optimization challenges still exist.

BRIEF DESCRIPTION

Aspects of the disclosure relate to methods, apparatuses, and/or systems for control optimization of building subsystems.

In some embodiments, a system for control optimization of building subsystems comprises at least one processor; and memory storing instructions executable by the at least one processor, the instructions when executed cause the system to: obtain building load information, the building load information related to one or more power consuming subsystems of the building; determine a future building load based on the building load information; and adjust one or more setpoint tolerances for the one or more subsystems based on the determined future building load.

In some embodiments, the system may be configured to obtain occupancy information for the building, wherein the future load is based on the occupancy information and the building load information.

In some embodiments, the system may be configured to determine a power source for powering the subsystems based on the determined future building load, wherein adjusting the one or more or more setpoint tolerances is further based on the determined power source.

In some embodiments, determining the future building load comprises generating a building load forecast for a given period of time, and determining the power source comprises generating a power source forecast for the given period of time, and the system may be configured to adjust the one or more setpoint tolerances for the given period of time.

In some embodiments, the system may be configured to determine a future occupancy for the building based on the occupancy information, and wherein determining a future building load for the building is further based on the determined future occupancy.

In some embodiments, the system may be configured to determine an adjustment amount for the setpoint tolerances based on the determined power source.

In some embodiments, the system may be configured to generate a recommendation for the determined power source; and responsive to the user accepting the recommendation, adjusting the one or more setpoint tolerances.

In some embodiments, a method being implemented in a system comprising at least one processor, and memory storing instructions. The method comprises: obtaining building load information, the building load information related to one or more power consuming subsystems of the building; determining a future building load based on the building load information; and adjusting one or more setpoint tolerances for the one or more subsystems based on the determined future building load.

In some embodiments, a non-transitory computer-readable storage medium storing program instructions computer-executable to implement: obtaining building load information for the building, the building load information related to one or more power consuming subsystems of the building; determining a future building load based on the building load information; and adjusting one or more setpoint tolerances for the one or more subsystems based on the determined future building load.

Various other aspects, features, and advantages of the invention will be apparent through the detailed description of the invention and the drawings attached hereto. It is also to be understood that both the foregoing general description and the following detailed description are examples and not restrictive of the scope of the invention.

BRIEF DESCRIPTION OF THE DRAWINGS

FIG. 7 shows an example of a computer system that may be used to implement aspects of the techniques described herein.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

The present disclosure, in accordance with some embodiments, describes a system 100 for control optimization of building subsystems. In some embodiments, the building may be one or more or more of a residential home, an office building, a store, a healthcare facility, a factory, a school, a shopping mall, a recreation center, a gym, etc. In some embodiments, system 100 may generate building load and energy source forecasts using internal and external data sources. For example, system 100 may be configured to generate the building load and the energy source based on one or more of occupancy information, building load information, weather information, or historic power generation information. In some embodiments, system 100 may be configured to determine one or more optimization objective functions using weather forecasts. The optimization objective functions may be used to optimize power source selection using building load forecast, power generation forecast, power storage state of charge, or previous recommendations. In some embodiments, system 100 may be configured to generate microgrid source selection recommendation based on the optimized power source selection.

In some embodiments, system 100 may be configured to use the source selection recommendation to select power source and to set local control setpoint tolerances of the building subsystems. Accordingly, the present methods and systems may help optimize the use of subsystems of a smart building. For example, smart buildings connected to a microgrid consisting of a renewable energy source and power storage (e.g., battery storage) may use one or more predictive models of system 100 to recommend a particular usage pattern of grid energy, battery power, and renewable power over a moving horizon (e.g., 24-hrs., week, etc.). The local building control may respond adjusting the subsystems tolerances based on the power source used. For example, local building control may respond by increasing control tolerances when grid power is used, decreasing control tolerances when renewable power is used, pre-cooling/pre-heating the building when energy is inexpensive, delaying pre-cooling/pre-heating for a time when energy is expected to be inexpensive, etc. Other factors may be included in the optimized control as detailed herein (e.g., occupancy prediction, severe weather prediction, etc.).

Figure 1:
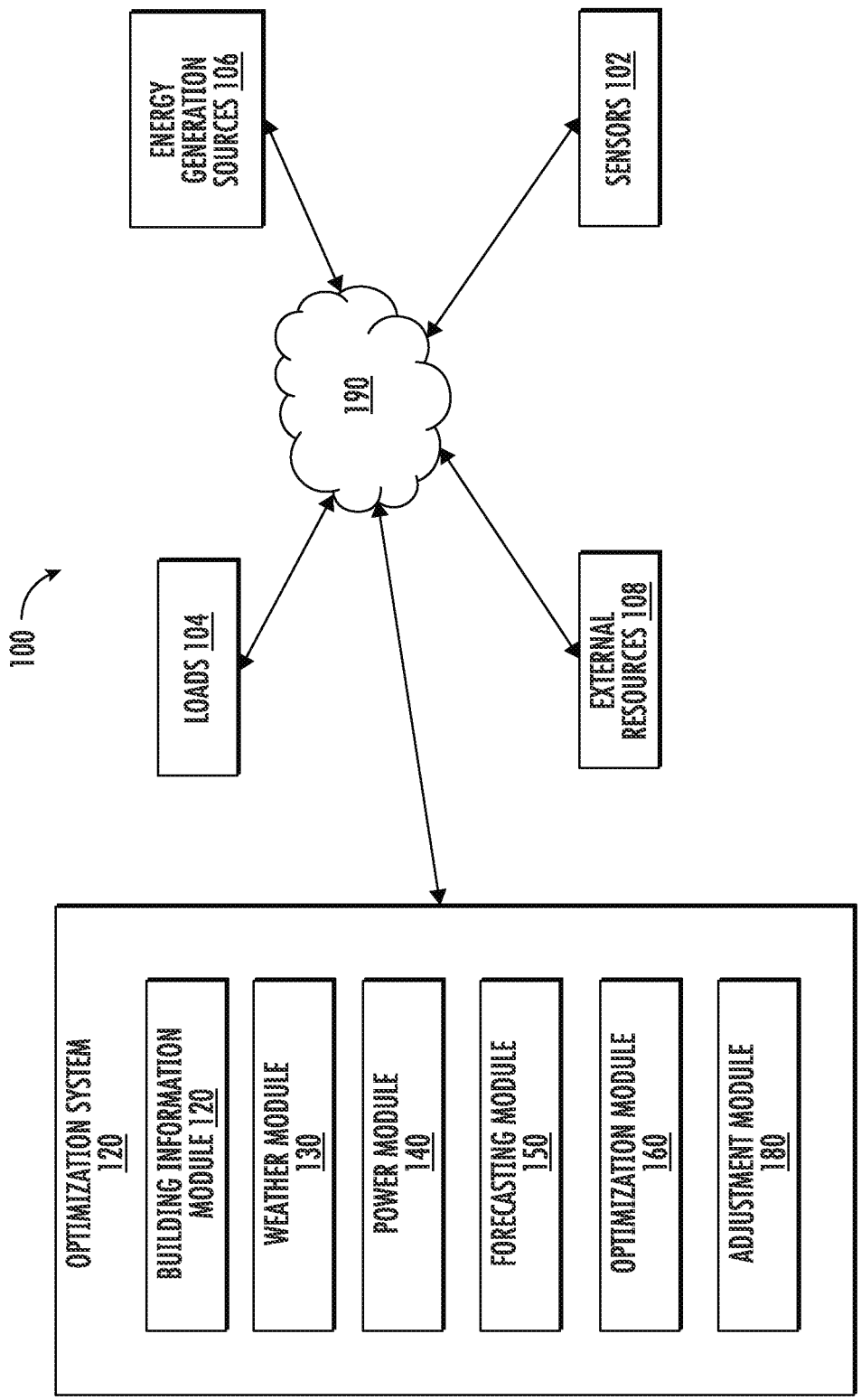
FIG. 1 shows an example of a system for control optimization of building subsystems, in accordance with one or more embodiments.

FIG. 1 shows a system 100 for control optimization of building subsystems, in accordance with one or more embodiments. In some embodiments, system 100 may include an optimization system 110, loads 104, energy sources 106, external resources 108, and/or other components. Other components known to one of ordinary skill in the art may be included in system 100 to gather, process, transmit, receive, acquire, and provide information used in conjunction with the disclosed embodiments. In addition, system 100 may further include other components that perform or assist in the performance of one or more processes that are consistent with disclosed embodiments.

Loads 104 may include one or more subsystems of the building that consume power. In some embodiments, loads 104 may include independent subsystems managed by independent control systems. In some embodiments, loads 104 may be located inside the building, outside the building (e.g., in proximity of, or in the area surrounding the building). In some embodiments, loads 104 may include one or more of HVAC subsystems, lighting subsystems, refrigeration subsystems, water treatment (e.g., heater, softener, filter, etc.) subsystems, air treatment subsystems, fire subsystems, elevator subsystems, security subsystems, appliance subsystems, server/computer subsystems, charging station subsystems, or other subsystems of the building that consume power. In some embodiments, one or more of loads 104 may be managed by one control system (e.g., a building control system). In some embodiments, one or more of the subsystems of loads 104 are stand-alone devices (e.g., a water heater). In some embodiments, one or more subsystems may include one or more devices, controllers, sensors, or other components that perform or assist in the performance of the subsystems (e.g., HVAC, security, server/computer, lighting subsystems, etc.). It's to be noted that these examples of loads/subsystems are for illustration purposes only, other subsystems (or devices) that consume power in the building (outside the building or related to the building) may be considered and are compatible with the present disclosure.

Sensors 102 may be configured to generate output signals related to parameters related to the functioning or performance of the subsystems, or parameters related to the general environment of the building (e.g., within or outside the building). In some embodiments, one or more subsystems of loads 104 may include one or more of sensors 102. In some embodiments, the sensors may be independent of the subsystems (e.g., located within or outside system 100) and configured to be in communication with the subsystems. For example, the sensors may include one or more of temperature sensors, pressure sensors, humidity sensors, air flow sensors, light sensors, sound sensors, air quality sensors, water quality sensors, gas particles detectors (e.g., $CO_2$, $O_2$, CO, etc.), smoke detectors, energy consumption sensors (or meters), energy generation sensors (or meters), fluid level sensors, fluid flow sensors, optical sensors, motion sensors, occupancy sensors, image sensors, accelerometers, gyroscopes, or other sensors for measuring parameters related to the functioning or performance the subsystems.

Energy source 106 may include one or more sources of energy provided to the building. In some embodiments, energy source 106 may include utility energy (e.g., power from a power provider), renewable energy (solar, thermal, kinetic energy, wind, water, or other renewable energy), stored energy (batteries, generators, or other stored energy). In some embodiments, energy source 106 may include one or more sources of energy generated by the building (e.g., one or more or more subsystems of the building that generate power).

Optimization system 110 may include a building information module 120, a weather module 130, power source module 140, a forecasting module 150, an optimization module 160, adjustment module 180, and/or other components. In some embodiments, optimization system 110 may include computing resources such as processors and memory devices for storing instructions (e.g., computing system 700 described herein below with reference to FIG. 7). The processors may be configured to execute software instructions to perform various operations of system 100. The computing resources may include software instructions to perform operations of modules 110, 120, 130, 140, 150, 160, 180 and/or other components of system 100.

Building information module 120 may be configured to obtain information related to the building. For example, the information related to the building may include one or more of building type, occupancy information, load information, building energy consumption information, or other building related information. In some embodiments, building information module 120 may obtain the building information from one or more or more components of system 100 (e.g., loads 104, energy source 106, sensors 102, external resources 108), from user input, or from components outside of system 100 (e.g., databases or storage).

In some embodiments, the building type information may include characteristics of the building. For example, structure, size, shape, number of stories, rooms, garages, yards, parking lots, or other information related to the building or to its surrounding areas. In some embodiments, the building type information may include information related to the type of use. For example, residential, commercial, industrial, educational, recreational use, or other information related to the type of use of the building.

In some embodiments, building information module 120 may be configured to determine occupancy information for the building. The occupancy information may include information related to occupants of the building. In some embodiments, an occupant may refer to a person who is at the building. In some embodiments, an occupant is a person who is inside the building. In some embodiments, an occupant may be a person who is in the basement of the building, on the roof, in proximity of, or in the area surrounding the building. In some embodiments, occupancy information may indicate the number of occupants of the building. In some embodiments, the occupancy information may include the type of occupants (e.g., children, elderly, patients, workers, visitors, owners, etc.) In some embodiments, occupancy information may indicate the length of occupancy for each occupant. For example, building information module 120 may be configured to obtain a time when an occupant enters and exits the building and determine the length of their stay. In some embodiments, the occupancy information may include information about the location of the occupants. For example, the occupancy information may indicate the location of the occupant in the building (e.g., room, office, floor, space, garage, pool, basement, roof, etc.) or outside the building (e.g., yard. driveway, parking lot, in proximity, approaching, leaving, etc.). In some embodiments, occupancy information may be determined based on occupancy schedule for the occupants or the building. For example, the occupancy information may be obtained based on opening hours of a building, employees' work schedules, maintenance schedule, or other building related schedules that may indicate the number of occupants and the times of the scheduled occupancy. In the case of a home, the occupancy may be based on schedules of family members.

In some embodiments, building information module 120 may be configured to obtain historical occupancy information. The historical occupancy information may indicate the number of occupants, the type of occupants, the time of occupancy, the length of occupancy, the location, or other historical occupancy information for the building. In some embodiments, building information module 120 may be configured to determine the occupancy information from data obtained from sensors 102, external resources 108, or other components within or outside system 100 (e.g., access control system for the building, scheduling systems, or other building control systems).

In some embodiments, building information module 120 may be configured to determine load information for the building. The load information may include information related to the one or more subsystems of the building that consume power (e.g., loads 104). In some embodiments, the building load information may include historical load information. For example, the building load information may include the number, type, location, status, energy use, energy needs, associated energy cost, or other information related to the building loads. In some embodiments, the building load information may be determined based on one or more or more load schedules (e.g., obtained from a building control system or a schedule database). In some embodiments, the building load information may be determined based on the determined occupancy information. For example, the building load information may be determined based on the number of occupants, type of occupants, length of occupancy, occupancy schedule, etc. In some embodiments, the building load information may be obtained from (or determined based on information from), one or more load controllers (e.g., controller of the load or a building control system), sensors 102, energy generation sources 106, or other components within or outside of system 100.

Weather module 130 may be configured to obtain weather information. In some embodiments, the weather information may include current, historic, or future (e.g., including weather forecasts, and historic weather forecasts) weather information. In some embodiments, the weather information may be obtained from one or more sensors (e.g., sensors 102), weather forecast APIs, external resources 108, user input via a user interface, or from other components within or outside of system 100.

Power module 140 may be configured to obtain power (or energy) information related to power provided to, generated by or consumed by the building. In some embodiments, the power information may include information related to the type of power (e.g., utility, renewable, stored, or other type of power). In some embodiments, the power information may include power source information related to the source of energy (e.g., utility companies, solar power generators, thermal power generators, kinetic energy power generators, wind power generators, waterpower generators, batteries, generators, or other power generators). In some embodiments, the power information may include information related to power demand, consumption, generation, cost, or other power information. For example, in some embodiments, power cost information may include one or more of cost of power at any given time, historical power cost, or future power cost. In some embodiments, the power cost may include cost of utility power (e.g., price for buying from an energy provider or price for selling to energy buyer), cost of generating power (e.g., renewable energy), cost of storing power, or other costs associated with obtaining, generating, selling, storing, or consuming power.

Forecasting module 150 may be configured to determine one or more building parameters related to the building (e.g., building information parameters, weather information parameters, power information parameters or other building related parameters). In some embodiments, forecasting module 150 may include one or more predictive models configured to calculate building parameter prediction values (e.g., predictive values for one or more or more of building load, weather, energy, occupancy, or other building related parameters). In some embodiments, the predictive models may use one or more data samples (current or historical) to calculate the prediction values (e.g., data samples obtained from building information module 120, weather module 130, power module 140, or from other components within or outside system 100). In some embodiments, the predictive models may use regression analysis models (e.g., linear regression models or generalized linear models) to calculate the building parameter prediction values. In some embodiments, it may be beneficial to use predictive models because it allows for using information from known data samples to predict information about the whole data set or to predict information about other related data sets.

In some embodiments, forecasting module 150 may be configured to determine one or more building parameters related to the building over time. For example, forecasting module 150 may be configured to generate one or more building parameters forecasts for a given time (e.g., specific time of day) or a given period of time or moving time horizon (e.g., number of hours, days, weeks, months, or other time periods). In some embodiments, forecasting module 150 may include one or more forecasting models (e.g., autoregressive moving average models, vector autoregression models, or other time series forecasting models) configured to generate the one or more or more building parameters forecasts.

In some embodiments, forecasting module 150 may include a machine learning system for training one or more or more machine learning models to determine/predict the building load. In some embodiments, may include one or more or more forecasting models configured to predict the building load using the building or weather information. In some embodiments, the machine learning system may be configured to use one or more of supervised learning, semi-supervised, unsupervised learning, reinforcement learning, and/or other machine learning techniques). In some embodiments, the machine learning models may include decision trees, support vector machines, regression analysis, Bayesian networks, random forest learning, dimensionality reduction algorithms, boosting algorithms, artificial neural networks (e.g., fully connected neural networks, deep convolutional neural networks, or recurrent neural networks), deep learning, and/or other machine learning models.

Examples of prediction and forecasts generated by forecast module 150 may include occupancy, home loads, energy source, or other forecasts. For example, forecasting module 150 may be configured to predict/forecast the building occupancy based on current, scheduled, or historic occupancy information. In some embodiments, forecasting module 150 may be configured to predict/forecast the building load based on one or more of the building information (current, scheduled, historic, or forecast), the weather information (current, historic, or forecast), or the power information (current, scheduled, historic, or forecast). Similarly, in some embodiments, the forecasting module 150 may be configured to predict/forecast power information. In some embodiments, the power forecast may include power generation sources forecast (e.g., power generation sources 106), available power forecast, power consumption forecast, power demand forecast, power distribution forecast, power cost forecast, or other power related forecasts. In some embodiments, the power forecast may be determined based on one or more of the weather information (current, historic, or forecast), the building load information (current, scheduled, historic, or forecast), the occupancy information (current, scheduled, historic, or forecast), or other building information.

Figure 2:
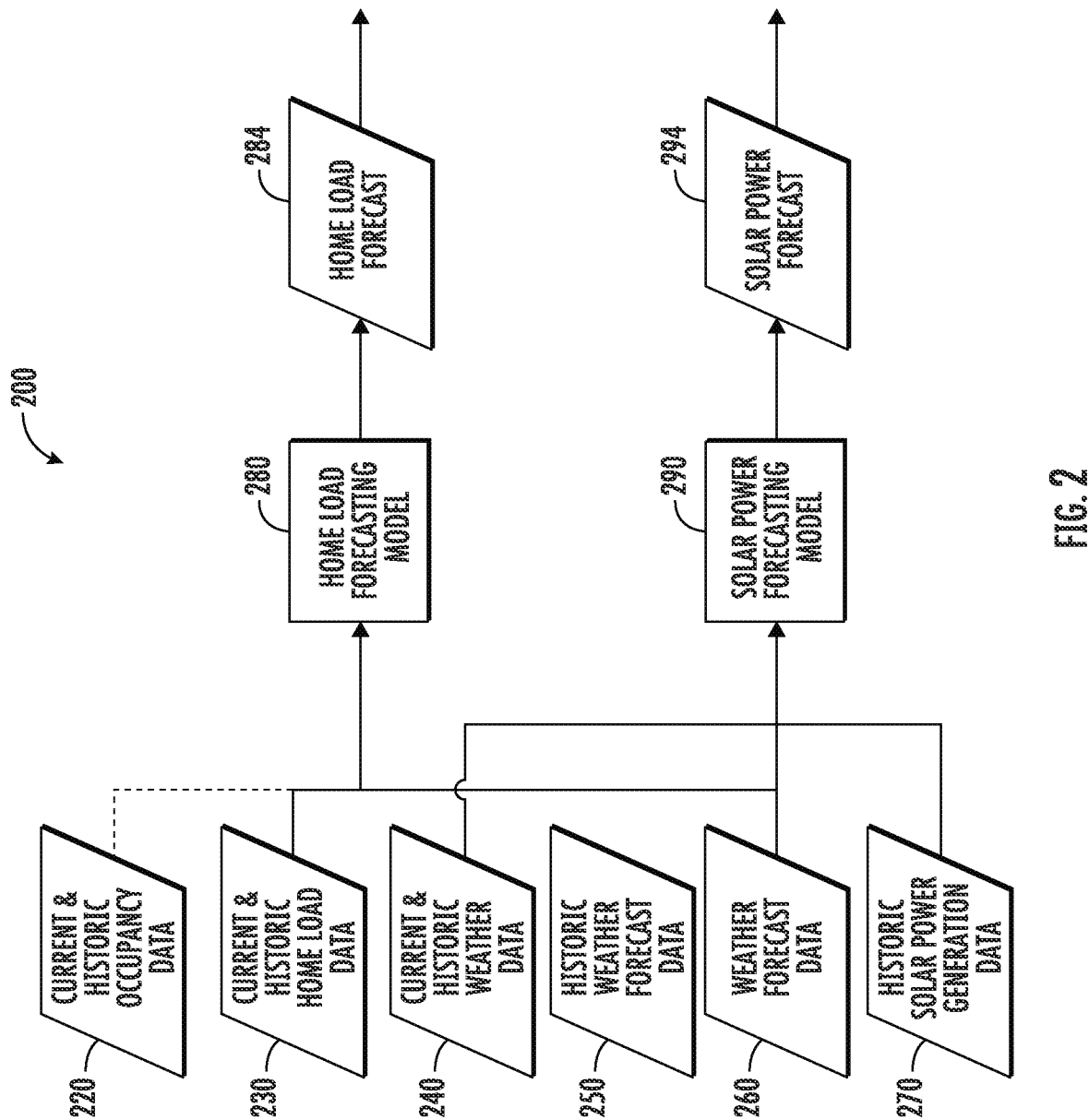
FIG. 2 shows an example operation by the system for control optimization of building subsystems, in accordance with one or more embodiments.

FIG. 2 illustrates an example 200 of control optimization of building subsystems, in accordance with one or more embodiments. Home load forecasting model 280 may be used to generate home load forecast 284 based on home load data (current and historic) 230, weather data (current and historic) 240, historic weather forecast data 250, and weather forecast data 260. In some embodiments, occupancy data (current and historic) 220 may also be used to generate the home load forecast. In some embodiments, a solar power forecasting model 290 may be configured to generate a solar power forecast 294 based on historic solar power generation data 270, weather data 240, historic weather forecast data 250, and weather forecast data 260. It's to be noted that the example described in FIG. 2 is for illustration purposes only. Other examples of power generation sources may be used and are compatible with the current disclosure (e.g., wind, thermal, water, or other renewable energy sources).

Returning to FIG. 1, in some embodiments, one or more building parameter forecasts obtained from forecast module 150 may be used to optimize energy source selection (or energy utilization). In some embodiments, optimization module 160 may be configured to optimize energy source selection based on one or more of weather, occupancy, building load, power source, or other building parameter information (or forecast). For example, optimization module 160 may include one or more optimization models configured for energy selection (or utilization) based on the obtained forecasts. For example, in some embodiments, the optimization models may include one or more objective functions (e.g., minimization functions or maximization functions) configured for energy selection optimization. In some embodiments, optimization module 160 may be configured to select a particular optimization model based on one or more of weather, occupancy, building load, power source, or other building parameter information (or forecast). In some embodiments, optimization module 160 may be configured to generate one or more source selection recommendation based on the energy source selection optimization. The recommendation may be displayed on a user display (e.g., a user may select to accept or refuse the recommended source selection).

Figure 3:
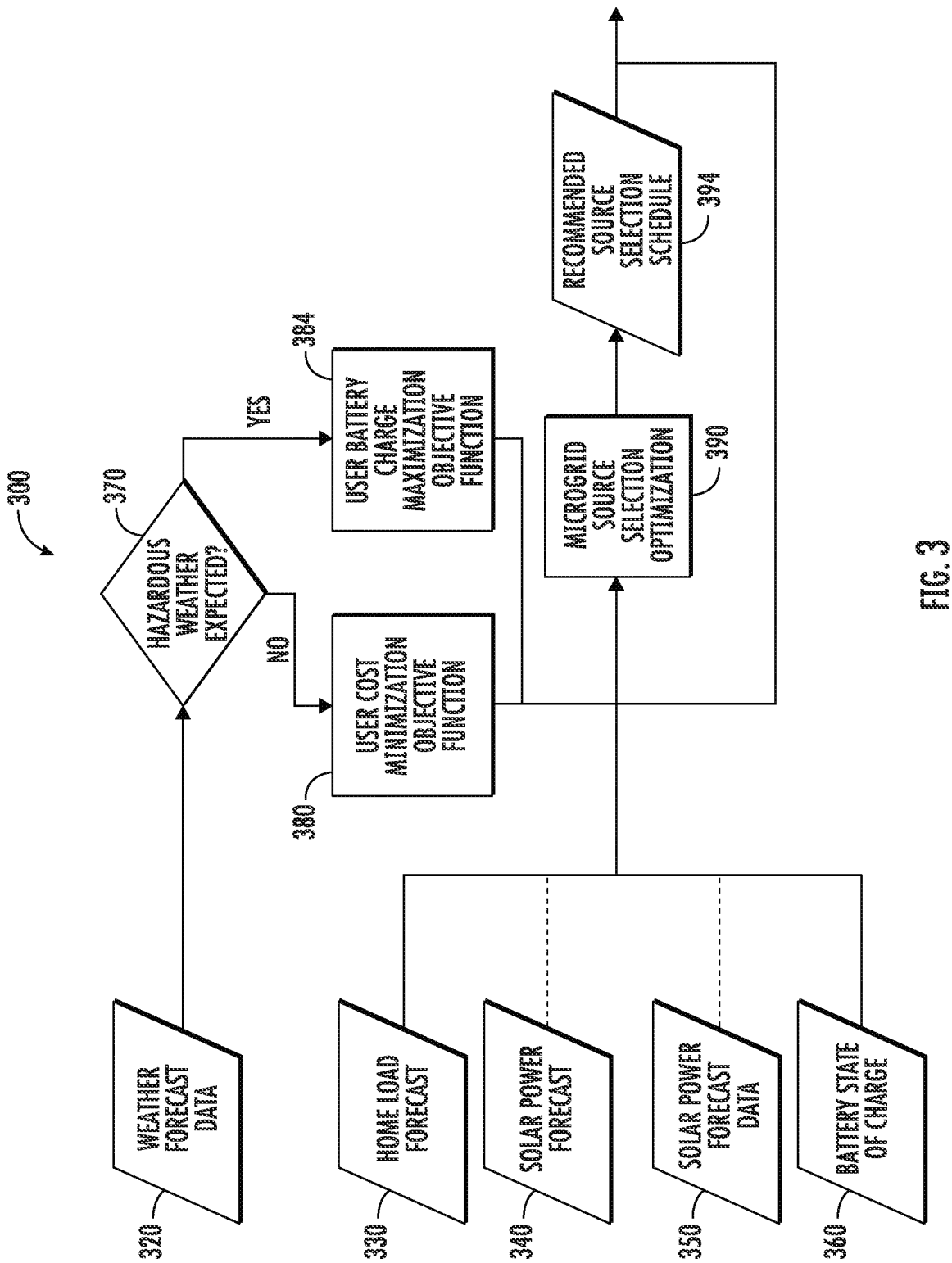
FIG. 3 shows an example operation by the system for control optimization of building subsystems, in accordance with one or more embodiments.

FIG. 3 illustrates an example 300 of control optimization of building subsystems, in accordance with one or more embodiments. At step 370, the optimization system may be configured to determine an optimization objective function based on weather forecast data 320. For example, if hazardous weather is expected (from the weather forecast), the system may use a battery charge maximization objective function 384, and if no hazardous weather is expected, the optimization system may use a cost minimization objective function 380. In some embodiments, at step 390, the optimization system may be configured to optimize power source selection using the appropriate objective function (determined at step 370) and one or more of home load forecast 330, solar power forecast 340, solar power forecast data 350, battery state of charge 360, or previous recommendations. At step 394, the optimization system may be configured to generate one or more source selection recommendations (e.g., a source selection schedule) based on the source selection optimization 390.

Figure 4:
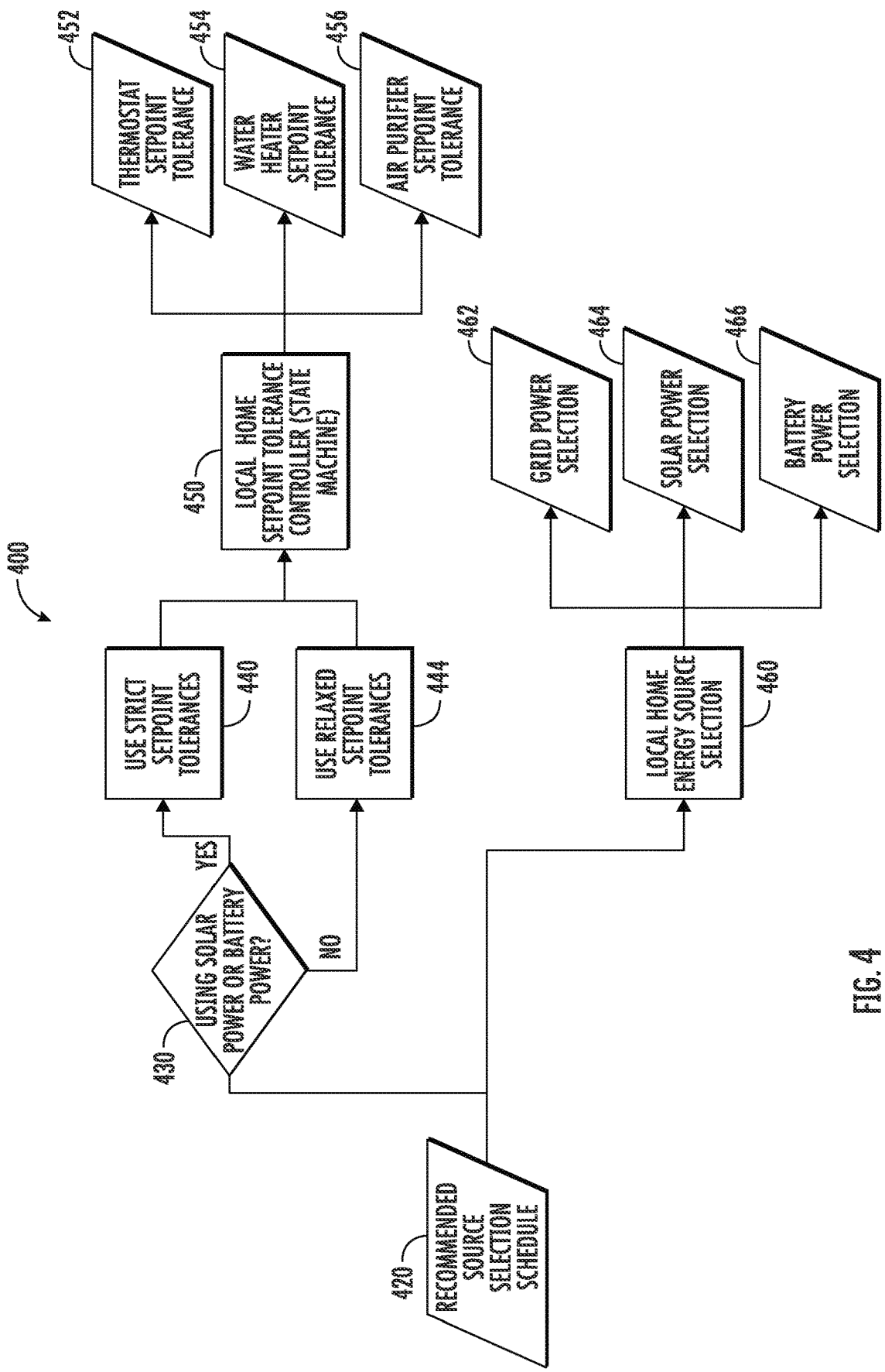
FIG. 4 shows an example operation by the system for control optimization of building subsystems, in accordance with one or more embodiments.

FIG. 4 illustrates an example 400 of control optimization of building subsystems, in accordance with one or more embodiments. At 460, the optimization system may be configured to select local home energy source based on the recommended source selection 420 (e.g., similar to recommendation 394 determined in FIG. 3). In some embodiments, the local home energy selection may include grid power selection 462 (e.g., to charge energy storage in preparation of bad weather, or based on building load, or when grid power is cheap, etc.), solar power selection 464 (e.g., based on weather forecast, building load, or when the grid power is expensive, etc.), or battery power selection 466 (e.g., based on based on weather forecast, building load, or when the grid power is expensive, etc.).

Returning to FIG. 1, adjustment module 180 may be configured to determine adjustments to one or more setpoint tolerances for one or more loads of the building. In some embodiments, a setpoint tolerance may refer to a range of permissible limits of variation in measured setpoint values for a building load (or subsystem). In some embodiments, adjustment module may be configured to determine the range of permissible limits (e.g., based on type of power used, weather conditions, occupancy, or type of load). In some embodiments, the range is pre-set (e.g., by a system administrator or manufacturer). In this case, the adjustment module 180 may be configured to adjust the tolerances within the pre-set range. In some embodiments, the adjustments may be in the form of a percentage of permissible variance (e.g., between 0.5-3.5%).

In some embodiments, determining the adjustments of the tolerances may be based on the one or more or more forecasts obtained from forecast module 150. For example, in some embodiments, the setpoint tolerances adjustments (or adjustment amount) may be determined based on the energy forecasts (e.g., based on the type of energy that will be used). For example, responsive to predicting that solar power or battery power will be used, adjustment module 180 may determine that strict setpoint tolerances are appropriate. In some embodiments, responsive to predicting that other sources (other than batteries or solar power) of energy will be used, adjustment module 180 may determine that more relaxed setpoints tolerances may be used. In some embodiments, adjustment module 180 may be configured to set the control tolerances according to the determined adjustments. In some embodiments, the strict/relaxed setpoint tolerances may be passed down to a building setpoint tolerance controller which in turn may adjust the tolerances of the subsystems of the building (e.g., loads 104).

In some embodiments, adjustment module 180 may be configured to set (or adjust) the control tolerances based on the source selection recommendations. In some embodiments, the source selection recommendation may include a tolerance adjustment recommendation. In some embodiments, responsive to the user accepting the source selection recommendation, the adjustment module may adjust the tolerances. For example, as shown in FIG. 4, based on the obtained source selection recommendation 420, the adjustment module may be configured to determine the type of energy used 430. If solar or battery power is used, then strict setpoint tolerances may be determined (or recommended or applied) at 440. If other power is used, then relaxed setpoint tolerances may be determined (or recommended or applied) at 444. In some embodiments, the adjustment module may be configured to adjust the setpoint tolerances for a plurality of subsystems (e.g., thermostat 452, water heater 454, air purifier 456, or other subsystems). In some embodiments, the setpoint tolerances determinations/adjustments/or recommendations may be passed to a local setpoint tolerance controller at 450. For example, the controller may be configured control the setpoint tolerances for one or more or more subsystems (e.g., thermostat 452, water heater 454, air purifier 456, or other subsystems).

Figure 5:
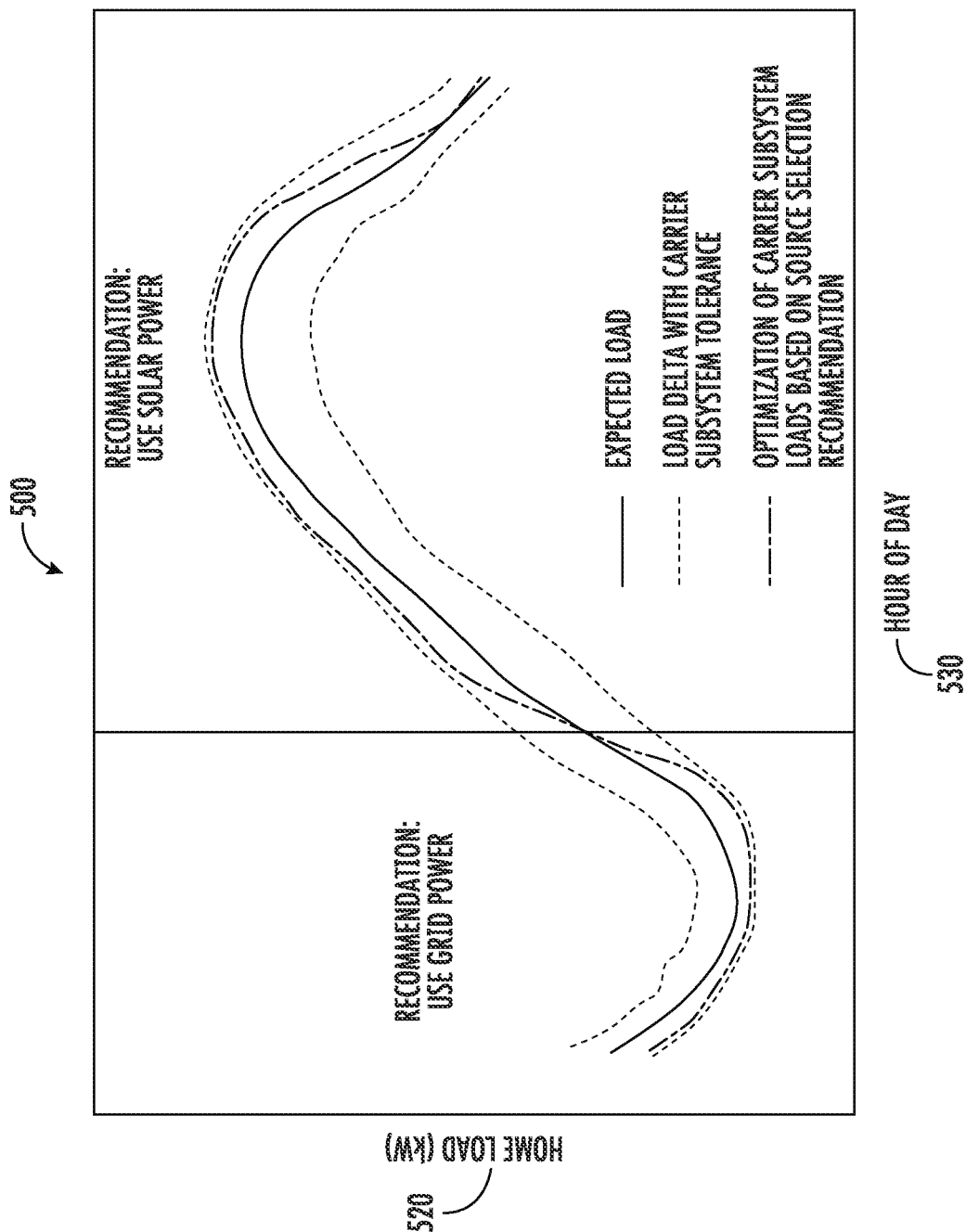
FIG. 5 shows an example graph of building loads over time, in accordance with one or more embodiments

FIG. 5 illustrates an example graph 500 of building load 520 as a function of time (in hour of day) 530, according to one or more embodiments. Graph 500 shows the optimization of the home load based on source selection recommendation by the optimization system 110. For example, when grid power is recommended the home load is kept closer to the lower setpoint tolerance threshold, and when the solar power is recommended, the home load is kept closer to the highest setpoint tolerance threshold.

In some embodiments, one or more components of system 100 may communicate directly through one or more dedicated communication links. In some embodiments system 100 may include a network 190 connecting one or more components of system 100. In some embodiments, network 190 may be any type of network configured to provide communications between components of system 100. For example, network may be any type of wired or wireless network (including infrastructure) that provides communications, exchanges information, and/or facilitates the exchange of information, such as the Internet, near field communication (NFC), optical code scanner, cellular network, a public switched telephone network ("PSTN"), text messaging systems (e.g., SMS, MMS), frequency (RF) link, Bluetooth®, Wi-Fi, a private data network, a virtual private network, a Wi-Fi network, a LAN or WAN network, or other suitable connections that enables the sending and receiving of information between the components of system 100. It will be appreciated that this is not intended to be limiting and that the scope of this disclosure includes implementations in which the client one or more components of system 100 are operatively linked via some other communication media.

It should be appreciated that the illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium.

Figure 6:
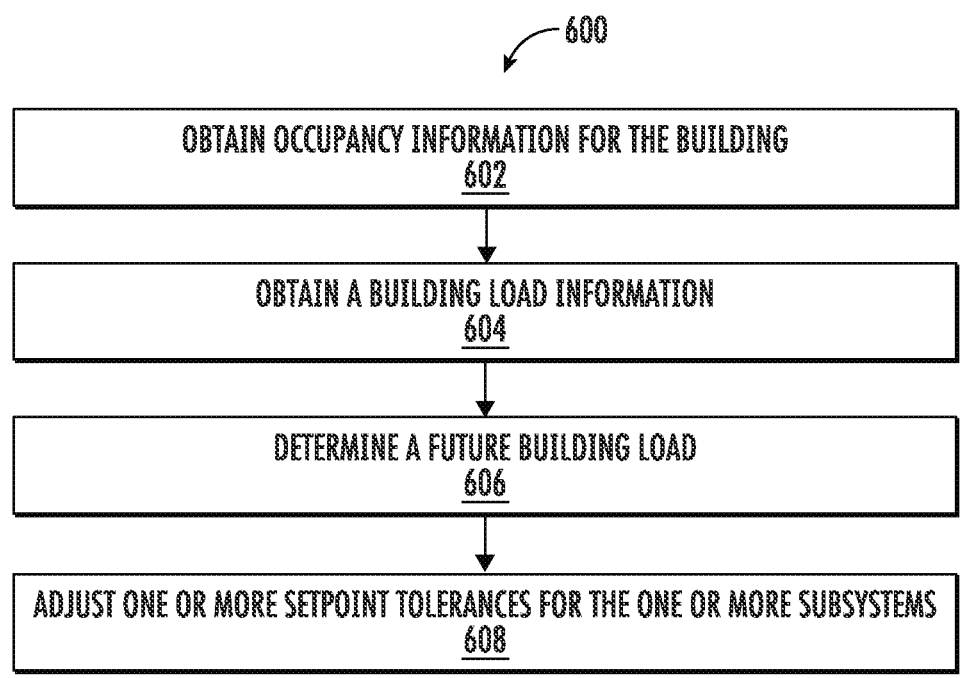
FIG. 6 shows a flow diagram illustrating a method for control optimization of building subsystems, in accordance with one or more embodiments.

FIG. 6 illustrates a method 600 for control optimization of building subsystems, in accordance with one or more embodiments of the present disclosure. The operations of method 600 presented below are intended to be illustrative. In some implementations, method 600 may be accomplished with one or more additional operations not described and/or without one or more of the operations discussed. Additionally, the order in which the operations of method 600 are illustrated in FIG. 6 and described below is not intended to be limiting In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the method.

At an operation 602 of method 600, occupancy information for the building may be obtained. In some embodiments, operation 602 may be performed by a building information module the same as or similar to building information module 120 (shown in FIG. 1 and described herein).

At an operation 604 of method 600, a building load information may be obtained. In some embodiments, the building load information may be related to one or more power consuming subsystems of the building. In some embodiments, operation 604 may be performed by a building information module the same as or similar to building information module 120 (shown in FIG. 1 and described herein).

At an operation 606 of method 600, a future building load may be determined. In some embodiments, the future building load may be determined based on the occupancy information and the building load information. In some embodiments, operation 606 may be performed by a forecasting module the same as or similar to forecasting module 150 (shown in FIG. 1 and described herein).

At an operation 608 of method 600, one or more setpoint tolerances for the one or more subsystems may be adjusted. In some embodiments, the adjustment may be based on the determined future building load. In some embodiments, operation 608 may be performed by an adjustment module the same as or similar to adjustment module 180 (shown in FIG. 1 and described herein).

Embodiments of one or more techniques of the present disclosure as described herein may be executed on one or more computer systems, which may interact with various other devices. One such computer system 700 is illustrated by FIG. 7. FIG. 7 shows an example of a computer system that may be used to implement aspects of the techniques described herein. In different embodiments, computer system 700 may include any combination of hardware or software that can perform the indicated functions, including, but not limited to, a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or other type of computing or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions, and may include one or more semiconductor(s) and/or transistors (e.g., electronic integrated circuits (ICs)). In such a context, processor-executable instructions may be electronically executable instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others. In some embodiments, one or more computers may include multiple processors operating in parallel. A processor may be a central processing unit (CPU) or a special-purpose computing device, such as graphical processing unit (GPU), an integrated circuit or on-chip system, an application-specific integrated circuit (ASIC), a field-programmable gate array (FPGA), a complex programmable logic device (CPLD), or application-specific integrated circuits.

System memory 720 may be configured to store program instructions and/or data accessible by processor 710. In various embodiments, system memory 720 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described in this disclosure, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example, via telecommunications/telephony networks such as analog voice networks or digital fiber communications networks;

via storage area networks such as Fibre Channel SANs, or via any other suitable type of network and/or protocol.

Input/output devices 750 may, in some embodiments, include one or more display terminals, cursor control devices (e.g., mouse), keyboards, keypads, touchpads, touchscreens, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Those skilled in the art will appreciate that computer system 700 is merely illustrative and is not intended to limit the scope of the present disclosure. In particular, computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. A system for control optimization of building subsystems, the system comprising:
    at least one processor;
    a controller configured to send control signals to a component outside of the system to adjust one or more setpoint tolerances for one or more power consuming subsystems; and
    memory storing instructions executable by the at least one processor, the instructions when executed cause the system to:
        obtain building load information, the building load information related to the one or more power consuming subsystems of the building;
        determine a future building load based on the building load information; and
        adjust the one or more setpoint tolerances for the one or more subsystems based on the determined future building load.

2. The system of claim 1, wherein the instructions further cause the system to:
    obtain occupancy information for the building, the future building load based on the occupancy information and the building load information.

3. The system of claim 2, wherein the instructions further cause the system to:
    determine a future occupancy for the building based on the occupancy information, and wherein determining of the future building load for the building is further based on the determined future occupancy.

4. The system of claim 1, wherein the instructions further cause the system to:
    determine a power source for powering the one or more subsystems based on the determined future building load, wherein adjusting of the one or more or more setpoint tolerances is further based on the determined power source.

5. The system of claim 4, wherein:
    determining of the future building load comprises generating a building load forecast for a given period of time, and wherein determining of the power source comprises generating a power source forecast for the given period of time, and wherein the instructions further cause the system to adjust the one or more setpoint tolerances for the given period of time.

6. The system of claim 4, wherein the instructions further cause the system to:

determine an adjustment amount for the one or more setpoint tolerances based on the determined power source.

7. The system of claim 4, wherein the instructions further cause the system to:

generate a recommendation for the determined power source; and responsive to a user accepting the recommendation, adjust the one or more setpoint tolerances.

8. A method for control optimization of building subsystems, the method being implemented in a system comprising at least one processor, a controller configured to send control signals to a component outside of the system to adjust one or more setpoint tolerances for one or more power consuming subsystems, and memory storing instructions, the method comprising:

obtaining building load information, the building load information related to the one or more power consuming subsystems of the building;

determining a future building load based on the building load information; and adjusting the one or more setpoint tolerances for the one or more subsystems based on the determined future building load.

9. The method of claim 8, further comprising:

obtaining occupancy information for the building, the future building load based on the occupancy information and the building load information.

10. The method of claim 9, further comprising:

determining a future occupancy for the building based on the occupancy information, and wherein determining the future building load for the building is further based on the determined future occupancy.

11. The method of claim 8, further comprising:

determining a power source for powering the one or more subsystems based on the determined future building load, wherein adjusting the one or more or more setpoint tolerances is further based on the determined power source.

12. The method of claim 11, wherein determining the future building load comprises generating a building load forecast for a given period of time, and wherein determining the power source comprises generating a power source forecast for the given period of time, and wherein the method further comprises:

adjusting the one or more setpoint tolerances for the given period of time.

13. The method of claim 11, further comprising:

determining an adjustment amount for the one or more setpoint tolerances based on the determined power source.

14. The method of claim 12, further comprising:

generating a recommendation for the determined power source; and responsive to a user accepting the recommendation, adjusting the one or more setpoint tolerances.

* * * * *